Patented Nov. 20, 1934

1,981,311

UNITED STATES PATENT OFFICE 1,981,311

PRODUCTION OF ORGANIC NITRO COMPOUNDS

Miles A. Dahlen, Wilmington, Del., and William L. Foohey, Pennsgrove, N. J., assignors to E. I. du Pont de Nemours & Company, Wilmington, Del., a corporation of Delaware No Drawing. Application June 23, 1933, Serial No. 677,342

10 Claims. (Cl. 260—142)

This invention relates to nitrochlorobenzenes, more particularly mono- and dinitrochlorobenzenes, and a process for the production thereof.

Para-nitrochlorobenzene is usually produced by the nitration of chlorobenzene. The original product is a mixture of para-nitrochlorobenzene and ortho-nitrochlorobenzene (and unimportant quantities of other substances), with the para-nitrochlorobenzene present in larger proportions. On cooling, such a mixture first deposits crystals of nearly pure para-nitrochlorobenzene, leaving an oil which is approximately the eutectic mixture of the ortho-nitrochlorobenzene and the para-nitrochlorobenzene. The eutectic mixture or a mixture which contains the ortho- and para-isomers in practically the same proportions as the eutectic mixture is subjected to fractional distillation at atmospheric or reduced pressure. Two fractions are obtained as end products, one rich in para-nitrochlorobenzene, the other in ortho-nitrochlorobenzene. Intermediate fractions are re-distilled. The fraction high in para-nitrochlorobenzene is crystallized, nearly pure para-nitrochlorobenzene and eutectic mixture being obtained as before. The fraction high in ortho-nitrochlorobenzene is again fractionally distilled, the process being repeated until pure ortho-nitrochlorobenzene is obtained.

Variations of the foregoing procedures include separation of ortho-nitrochlorobenzene by a fractional distillation of the fraction high in ortho-nitrochlorobenzene and separation of para-nitrochlorobenzene by a fractional distillation of the fraction high in para-nitrochlorobenzene. The two isomers may also be separated by repeated fractional distillation of the original mononitrochlorobenzene mixture.

The separation of either of the two isomers by crystallization from a mixture in which it is the larger component is based on the phase diagram for the system, which was prepared by Holleman and deBruyn, Recueil des Travaux Chimiques des Pays-Bas, 19, 191-2 (1900). The separation by means of fractional distillation is described in Centrallblatt, 1898, II, 238.

Crystallization of the isomers from ethyl alcohol has been used by many investigators for the preparation of pure samples for the purpose of identification, but this process has achieved no technical importance. According to one proposed method, the separation of the isomeric nitrochlorobenzene is effected by partially dissolving the mononitrochlorobenzene mixture in dilute methyl or ethyl alcohol at a temperature above the freezing point of the residue. The residue is then separated, and para-nitrochlorobenzene is recovered therefrom. Ortho-nitrochlorobenzene is recovered from the dissolved portion after removal of the alcohol.

The foregoing procedures which are applied commercially are relatively complex, involving repeated fractional crystallization or fractional distillation and are, therefore, rather expensive. Furthermore, while both of the end products, namely para-nitrochlorobenzene and ortho-nitrochlorobenzene, are important dye intermediates, the para-nitrochlorobenzene is far more important than the ortho-nitrochlorobenzene. In fact, the production of the latter by methods of the character above described is greatly in excess of the demand.

It is an object of this invention to provide a new and improved process for producing nitrochlorobenzenes. Another object is the provision of a new and improved process for the separation of para-nitrochlorobenzene from its mixtures with ortho-nitrochlorobenzene. A further object is the provision of a process for the production of nitrochlorobenzenes in which the end products are chiefly para-nitrochlorobenzene and the technically important dinitrochlorobenzene, rather than ortho-nitrochlorobenzene which is commercially a by-product of little value. Other objects will appear hereinafter.

These objects are accomplished according to this invention by subjecting mononitrochlorobenzene mixtures comprising essentially para-nitrochlorobenzene and ortho-nitrochlorobenzene to a partial dinitration by means of any suitable nitrating agent, whereby the ortho isomer is preferentially dinitrated. The product obtained consists of (a) mononitrochlorobenzene containing a very high proportion of para-nitrochlorobenzene, and (b) dinitrochlorobenzene, principally the 2,4- isomer but containing appreciable amounts of the 2,6- isomer. The components of the mixtures may be separated in any convenient manner, for example, by crystallization.

This novel procedure has resulted from a surprising and most important discovery, namely, that in mixtures of ortho-nitrochlorobenzene and para-nitrochlorobenzene the ortho isomer is very much more readily nitrated further to a dinitrochlorobenzene. So sharp is the preferential dinitration of the ortho isomer that under the proper conditions it may be removed almost completely from mixtures with the para-nitrochlorobenzene, with accompanying dinitration of the latter compound to only a relatively small extent.

While the invention is susceptible to considerable variation and modification in the manner of its practical application, particularly as regards the proportions of materials, temperatures and the exact method of procedure, the following examples, in which the parts are by weight, will serve to illustrate how the invention may be practised.

EXAMPLE I

A.—Mononitration

To 112.5 parts of chlorobenzene in a nitration equipment are slowly added 262 parts of a nitrating acid of the approximate constitution 25% nitric acid, 60% sulfuric acid and 15% water. During this addition of acid, the temperature of the mass is held at 55° C. to 60° C. The mass is stirred for about an hour at the same temperature and is then allowed to settle. The oil layer is separated and washed with water, and any adhering acid is neutralized with sodium carbonate. One hundred forty-five to one hundred fifty-five parts of oil are obtained, consisting of nitrochlorobenzenes in the approximate isomer ratio 65% para-: 35% ortho-, together with small quantities of unattacked chlorobenzene and of dinitrochlorobenzene.

B.—Crystallization

The oil or "mononitrochlorobenzene" is cooled to 20° C. to 25° C. in a suitable crystallizer, and the low-melting oil or eutectic mixture is removed. The crystalline material is re-crystallized several times, each time at a higher temperature than the last, until the crystallizing point of the solid reaches approximately 82° C. (representing nearly pure para-nitrochlorobenzene). The oil, which is separated from the solid at each successive crystallization subsequent to the first, is stored as "intermediate fraction" to be added to the "mononitrochlorobenzene" in the next charge.

The end products of this process (average of a series of charges) are as follows: 78.6 parts of nearly pure para-nitrochlorobenzene and 71.4 parts of eutectic mixture (composition about 30% para-nitrochlorobenzene and 70% ortho-nitrobenzene).

C.—Dinitration

One hundred fifty-seven and five-tenths parts (1.0 mol.) of eutectic mixture, obtained as described above, is treated with 44.1 parts (0.7 mol.) of nitric acid, as a mixed acid containing approximately 33% nitric acid and 67% sulfuric acid. The mixed acid is added to the eutectic mixture in nitrating equipment at a temperature of 60° C. to 65° C., and the mixture is held at this temperature for a short time. The temperature is then raised to 100° C. until the nitration is finished. The product is separated from the spent nitrating acid and washed with water to remove adhering acid.

D.—Separation

The product obtained is separated by fractional distillation under vacuum. The higher-boiling fraction consists of dinitrochlorobenzene, chiefly the 2,4-isomer. The low-boiling fraction consists of mononitrochlorobenzene of the approximate isomer ratio 60% para-nitrochlorobenzene: 40% ortho-nitrochlorobenzene. This fraction is subjected to the crystallization process described above to obtain nearly pure para-nitrochlorobenzene and eutectic mixture, the latter of which may be again partially dinitrated.

EXAMPLE II

Mononitrochlorobenzene, containing approximately 65% para-nitrochlorobenzene and 35% ortho-nitrochlorobenzene, is obtained by the nitration process described in Example I, Part A.

To 157.5 parts (1.0 mol.) of this material in nitration equipment is added 31.5 parts of nitric acid (0.5 mol.) as a mixed acid of the composition 33% nitric acid, 67% sulfuric acid. The dinitration is carried out in the manner described in Example I, Part C, viz, at 60° C. to 65° C. followed by heating to 100° C.

The product is washed as described in Example I, Part C, and is distilled under vacuum. The low-boiling fraction is mononitrochlorobenzene, composition approximately 81% para isomer; 19% ortho isomer. This fraction is subjected to the crystallization process of Example I, Part B. Para-nitrochlorobenzene and eutectic mixture are obtained. The high-boiling fraction consists of dinitrochlorobenzene, principally the 2,4- isomer.

EXAMPLE III

A.—Mononitration

One hundred twelve and five-tenths parts (1.0 mol.) of chlorobenzene is cooled in nitrating equipment to a temperature of −12° C. to −15° C. Sixty-three parts (1.0 mol.) of nitric acid as mixed acid (composition 25% nitric acid and 75% sulfuric acid) are slowly added, the temperature being held at −12° C. to −15° C., and the mass is maintained at the same temperature until nitration is complete. The mononitrochlorobenzene obtained in this nitration contains about 75% para-nitrochlorobenzene and 25% ortho-nitrochlorobenzene.

B.—Dinitration

To the nitration mass obtained in the above mononitration (or oil separated from it) are added 94.5 parts (1.5 mols.) of nitric acid as mixed acid (composition 25% nitric acid and 75% sulfuric acid), at a temperature of −12° C. to −15° C., and the mass stirred for several hours at this temperature.

The product of this dinitration is separated from the nitrating acid and washed, as described in the preceding examples. The oil is then subjected to a vacuum distillation. The mononitrochlorobenzene contains the isomers in the approximate ratio 95% para-: 5% ortho-. It is crystallized according to the process of Example I, Part B, para-nitrochlorobenzene and eutectic mixture being produced. The dinitrochlorobenzene fraction, as in the preceding examples, consists principally of 2:4-dinitrochlorobenzene.

The starting material may be nitrochlorobenzene containing the ortho- and para- isomers, varying in both directions from those given in the examples, and may be in the form of a separated product or as a constituent of a mixture, for example, with the "spent acid" of the mononitration.

In practising the invention, other nitrating agents, such as sodium nitrate, potassium nitrate and nitrogen oxides, may be considered as practical equivalents of nitric acid for the preparation of the nitrating acid. The composition of the mixed acids may be different from those described in the examples, or the sulfuric acid may be replaced at least partially by substances having a similar action, such as sulfur trioxide or oleum. In general, in the dinitration step it is preferable to use a nitrating acid having a concentration of about 20% to 50% nitric acid, the remainder being sulfuric acid.

It will be recognized that the results obtained will vary, depending upon such factors as temperature, quantity and composition of the nitrating acid, and the composition of the starting material. As indicated by the examples, good results have been obtained in the use of both relatively high temperatures and relatively low temperatures in the dinitration step. The amount of nitrating acid employed in the dinitration step should preferably be approximately the theoretical amount or a slight excess of that required for conversion of the ortho-nitrochlorobenzene present in the mixture to dinitrochlorobenzene, in the case of preferential dinitration at relatively high temperatures (50° C. to 100° C.). A larger excess of nitrating acid is necessary in the case of nitrations carried out at lower temperatures.

The advantages of the invention will be apparent. It provides a new and improved method of producing para-nitrochlorobenzene and 2,4-dinitrochlorobenzene, both of which are very important intermediates in the manufacture of dyes. The process is very flexible and, if desired, may be so operated that ortho-nitrochlorobenzene may be obtained from the eutectic mixtures by distillation in the usual way. However, since ortho-nitrochlorobenzene is not ordinarily used in very large quantities, as compared with para-nitrochlorobenzene and 2,4-dinitrochlorobenzene, the present invention provides an important technical improvement over the prior art in that the production of the ortho- isomer along with the para- isomer is no longer necessary. The process is especially advantageous since the separation of ortho- and para-nitrochlorobenzenes is a tedious and expensive process, while the separation of para-nitrochlorobenzene from dinitrochlorobenzene may be effected by a simple fractional distillation.

As many apparently widely different embodiments of this invention may be made without departing from the spirit and scope thereof, it is to be understood that we do not limit ourselves to these specific embodiments thereof except as defined in the appended claims.

We claim:

1. In a process of producing nitrochlorobenzenes, the step which comprises treating a mononitrochlorobenzene mixture comprising essentially para-nitrochlorobenzene and ortho-nitrochlorobenzene with a nitrating agent in sufficient amount and concentration for partial dinitration, whereby the ortho-nitrochlorobenzene is preferentially dinitrated.

2. In a process of producing nitrochlorobenzenes, the steps which comprise treating a mononitrochlorobenzene mixture comprising essentially para-nitrochlorobenzene and ortho-nitrochlorobenzene with a nitrating agent in sufficient amount for partial dinitration, whereby the ortho-nitrochlorobenzene is preferentially dinitrated, and separating the resultant dinitrochlorobenzene from the mononitrochlorobenzene.

3. In a process of producing nitrochlorobenzenes, the steps which comprise treating a mononitrochlorobenzene mixture comprising essentially para-nitrochlorobenzene and ortho-nitrochlorobenzene with a nitrating agent in sufficient amount and concentration for partial dinitration, whereby the ortho-nitrochlorobenzene is preferentially dinitrated, and separating the resultant dinitrochlorobenzene from the mononitrochlorobenzene by a fractional distillation.

4. In a process of producing nitrochlorobenzenes, the steps which comprise treating a mononitrochlorobenzene mixture comprising essentially para-nitrochlorobenzene and ortho-nitrochlorobenzene with a nitrating agent in sufficient amount and concentration for partial dinitration, whereby the ortho-nitrochlorobenzene is preferentially dinitrated, separating the resultant dinitrochlorobenzene, and crystallizing para-nitrochlorobenzene from the residual mononitrochlorobenzene mixture.

5. In a process of producing nitrochlorobenzenes, the steps which comprise treating a mononitrochlorobenzene mixture comprising essentially para-nitrochlorobenzene and ortho-nitrochlorobenzene with a nitrating agent in sufficient amount and concentration for partial dinitration, whereby the ortho-nitrochlorobenzene is preferentially dinitrated, separating the resultant dinitrochlorobenzene from the mononitrochlorobenzene, cooling the mononitrochlorobenzene to effect crystallization of the para-nitrochlorobenzene contained therein, and subjecting the residual eutectic mixture to partial dinitration and separation as before.

6. The process of producing para-nitrochlorobenzene and dinitrochlorobenzene which comprises mononitrating chlorobenzene, subjecting the mononitrated product to partial dinitration, separating the resultant product into two fractions, the one comprising substantially mononitrochlorobenzene and the other dinitrochlorobenzenes, and recovering para-nitrochlorobenzene from the mononitrochlorobenzene fraction.

7. The process of producing para-nitrochlorobenzene and 2,4-dinitrochlorobenzene which comprises mononitrating chlorobenzene, crystallizing para-nitrochlorobenzene from the resultant monitrochlorobenzene mixture, subjecting the residual eutectic mononitrochlorobenzene mixture to partial dinitration, separating the resultant product into two fractions, one comprising essentially mononitrochlorobenzene and the other dinitrochlorobenzene, recovering 2,4-dinitrochlorobenzene from the dinitrochlorobenzene fraction, crystallizing para-nitrochlorobenzene from the mononitrochlorobenzene fraction, and subjecting the mother liquor from the mononitrochlorobenzene fraction to dinitration and separation as before.

8. The process of claim 1, in which the nitrating agent comprises substantially a mixed acid containing about 20% to about 50% nitric acid, the remainder being sulfuric acid.

9. The process which comprises adding a nitrating acid to chlorobenzene in sufficient amount and concentration for mononitration, separating the mononitrated chlorobenzene mixture formed and neutralizing it, cooling to effect crystallization, filtering the crystallized material from the eutectic mononitrochlorobenzene mixture, recrystallizing said material fractionally at higher temperatures, adding the mother liquor from each crystallization subsequent to the first to a mononitrated chlorobenzene mixture obtained in a succeeding charge, reacting the eutectic mononitrochlorobenzene mixture with a nitrating acid in sufficient amount and concentration for a partial dinitration, subjecting the resultant nitrochlorobenzene mixture to fractional distillation under vacuum, recovering the higher boiling fraction comprising essentially dinitrochlorobenzene, crystallizing the lower boiling fraction to recover para-nitrochlorobenzene, and adding the residual eutectic mixture to a subsequent charge to be dinitrated and separated as before.

10. The process which comprises adding about 762 parts of a nitrating acid of the approximate composition 25% nitric acid, 60% sulfuric acid and 15% water to about 112.5 parts of chlorobenzene at a temperature of about 55° C. to about 60° C., separating the mononitrated chlorobenzene mixture formed, neutralizing it, cooling it to 20° C. to 25° C. whereby crystallization occurs, filtering the crystallized material from the eutectic mononitrochlorobenzene mixture, re-crystallizing it fractionally at higher temperatures, adding the mother liquor from each crystallization subsequent to the first to a mononitrated chlorobenzene mixture obtained in a succeeding charge, reacting a mixed acid containing about 33% nitric acid and 67% sulfuric acid with the eutectic mixture in proportions corresponding to about 44.1 parts of acid for each 157.5 parts of eutectic mixture at a temperature of about 60° C. to about 65° C., raising finally to about 100° C., separating the nitrochlorobenzene mixture, subjecting it to fractional distillation under vacuum, recovering the higher boiling fraction comprising essentially dinitrochlorobenzene, crystallizing the lower boiling fraction to recover para-nitrochlorobenzene, and adding the residual eutectic mixture to a subsequent charge to be dinitrated and separated as before.

MILES A. DAHLEN.
WILLIAM L. FOOHEY.